US007265792B2

(12) United States Patent
Favrat et al.

(10) Patent No.: US 7,265,792 B2
(45) Date of Patent: Sep. 4, 2007

(54) TELEVISION RECEIVER FOR DIGITAL AND ANALOG TELEVISION SIGNALS

(75) Inventors: Pierre Favrat, Milpitas, CA (US); Alain-Serge Porret, Sunnyvale, CA (US); Dominique Python, Sunnyvale, CA (US); Friederich Mombers, San Jose, CA (US); Richard P. Perring, San Jose, CA (US); Philippe Duc, Santa Clara, CA (US); Benito Carnero, Santa Clara, CA (US); Didier Margairaz, San Jose, CA (US)

(73) Assignee: Xceive Corporation, Santa Clara, CA (US)

( * ) Notice: Subject to any disclaimer, the term of this patent is extended or adjusted under 35 U.S.C. 154(b) by 481 days.

(21) Appl. No.: 10/884,347

(22) Filed: Jul. 1, 2004

(65) Prior Publication Data

US 2006/0001779 A1 Jan. 5, 2006

(51) Int. Cl.
*H04N 3/27* (2006.01)
*H04N 5/46* (2006.01)
(52) U.S. Cl. ...................... 348/554; 348/558
(58) Field of Classification Search ............. 348/554, 348/558, 725, 726, 705, 706; 375/316, 340; 455/189.1, 245.2, 179.1, 188.1, 192.1, 334
See application file for complete search history.

(56) References Cited

U.S. PATENT DOCUMENTS 4,872,054 A * 10/1989 Gray et al. ............. 348/441

| | | | |
|---|---|---|---|
| 6,369,857 B1 | 4/2002 | Balaban et al. | |
| 6,643,502 B1 * | 11/2003 | Van De Plassche et al. | 455/339 |
| 2002/0057366 A1 | 5/2002 | Oku et al. | |
| 2004/0061804 A1 | 4/2004 | Favrat et al. | |

FOREIGN PATENT DOCUMENTS

EP 0 516 216 A2 5/1992

OTHER PUBLICATIONS

International Search Report including written opinion, 11 pages.

* cited by examiner

*Primary Examiner*—Victor R. Kostak
(74) *Attorney, Agent, or Firm*—Patent Law Group LLP; Carmen C Cook (57) ABSTRACT

A television receiver includes a frequency conversion circuit, an analog-to-digital converter, a signal processor, and a signal output circuit. The frequency conversion circuit receives an input RF signal in one of several television signal formats and converts the input RF signal to an intermediate frequency signal. The analog-to-digital converter samples the intermediate frequency signal and generates a digital representation thereof. The signal processor processes the digital representation of the intermediate frequency signal in accordance with the television signal format of the input RF signal and generates digital output signals indicative of information encoded in the input RF signal. Finally, the signal output circuit receives the digital output signals from the signal processor and provides one or more output signals corresponding to the digital output signals. The signal output circuit can be configured to provide output signals corresponding to an analog television format or a digital television format or both.

29 Claims, 3 Drawing Sheets

TELEVISION RECEIVER FOR DIGITAL AND ANALOG TELEVISION SIGNALS

FIELD OF THE INVENTION

The present invention relates to a television signal receiver, and in particular, the present invention relates to a broadband television signal receiver for receiving multi-standard analog television signals and digital television signals.

DESCRIPTION OF THE RELATED ART

A television (TV) or video recorder includes a television signal receiver (or television receiver) to receive terrestrial broadcast, cable television or satellite broadcast television signals and to process the television signals into the appropriate video signals for display or for recording. Television signals are transmitted in analog or digital formats and in accordance with a variety of standards. For analog television transmission, the NTSC (National Television Standards Committee) standard, the PAL (Phase Alternate Lines) standard, and the SECAM (Sequential Couleur Avec Memoire) standard are widely adopted. On the other hand, for digital television transmission, the DVB (Digital Video Broadcast) format and the ATSC (Advanced Television Standards Committee) format are available. Because the different television formats and different television standards are incompatible, television receivers are traditionally made specifically for the analog or digital format and for a specific standard. Thus, televisions or video recording equipments are dedicated equipments which can only be used in the geographic regions in which the television standard is broadcasted.

The operation of a conventional television receiver includes two main components. First, the receiver receives the incoming television signal in radio frequency (RF) and converts the incoming RF signal to an intermediate frequency (IF) signal. Then, the receiver converts the IF signal to a video baseband signal and an audio baseband signal. The baseband signals are coupled to appropriate video and audio decoders to generate the display video signals (e.g. RGB) or sound. In general, the conventional television receiver includes a tuner for receiving the input RF signal and converting the RF signal to an IF signal by one or more frequency conversions. The frequency conversions are generally implemented as single or dual super-heterodyne conversions. In conventional television receivers, the intermediate frequency is dictated by the geographical area the receivers are to be used. Currently, there are five intermediate frequencies being used in the world. For example, in the United States, the IF is 41 to 47 MHz.

The conventional television receiver also includes a channel filter and a demodulator for converting the IF signal to video and audio baseband signals. The channel filter is typically a discrete filter implemented as a SAW (Surface Acoustic Wave) filter. The shape of the SAW filter is designed specifically for the format (analog or digital TV) and the television standard (NTSC, PAL or SECAM) of the television signals being received. The demodulator is typically a dedicated component and designed specifically for a predetermined television signal format and a predetermined television standard. For analog television signal reception, the demodulator is a VIF/SIF module. The VIF/SIF module provides a video output called CVBS (Composite Video Baseband Signal) and audio outputs, such as MPX or A2. For digital television signal reception, the demodulator is a digital demodulator typically including a down-converter, an analog-to-digital converter and other supporting circuitry to perform the demodulation. The digital demodulator outputs data in a MPEG data stream.

Television receivers for receiving both analog and digital television signals are being developed. These dual-format television receivers are typically implemented by duplicating the hardware required for processing the analog television signals and digital television signals. For instance, it is known to implement a dual-format television receiver by using a bank of channel filters, each of the channel filters designed for a specific format and standard, and a bank of demodulators, each demodulator receiving filtered signals from a corresponding channel filter. A switch can be used to select the desired signal processing path including the desired channel filter and the associated demodulator. An alternate implementation, proposed by U.S. Pat. No. 6,369,857 to Balaban, involves digitizing the intermediate frequency signal and processing the digitized signal using two separate processing circuitry—one for the analog television signal and one for the digital television signal.

A television receiver for providing dual-format reception is desired. It is further desirable that such a dual-format television receiver be cost effective to manufacture and provides high quality video and audio performance.

SUMMARY OF THE INVENTION

According to one embodiment of the present invention, a television receiver includes a frequency conversion circuit, an analog-to-digital converter, a signal processor, and a signal output circuit. The frequency conversion circuit receives an input RF signal and converts the input RF signal to an intermediate frequency signal having an intermediate frequency (IF). The input RF signal encodes information in one of several television signal formats. The analog-to-digital converter samples the intermediate frequency signal and generates a digital representation thereof. The signal processor processes the digital representation of the intermediate frequency signal in accordance with the television signal format of the input RF signal and generates digital output signals indicative of information encoded in the input RF signal. Finally, the signal output circuit receives the digital output signals from the signal processor and provides one or more output signals corresponding to the digital output signals.

In one embodiment, the television signal formats include an analog television format and a digital television format. The signal output circuit can be configured to provide output signals corresponding to an analog television format or a digital television format or both. In another embodiment, the television receiver is formed as a monolithic integrated circuit.

The present invention is better understood upon consideration of the detailed description below and the accompanying drawings.

DETAILED DESCRIPTION OF THE PREFERRED EMBODIMENTS

In accordance with the principles of the present invention, a dual-format television (TV) receiver for receiving analog and digital TV signals uses a single signal processing circuit for processing the received input RF television signal. The dual-format television receiver provides output signals indicative of the analog or digital television format of the received television signal. The output signals can be coupled to demodulators and/or decoders to generate the baseband signals and subsequently the video/audio signals for display or recording. In one embodiment, the dual-format TV receiver includes a frequency conversion circuit (a tuner), a digitizing IF circuit, a digital signal processor (DSP) circuit and a signal output circuit. In one embodiment, the dual-format TV receiver provides a first output signal that is the video baseband signal for television signals transmitted in the analog format, a second output signal that is the audio baseband signal for television signals transmitted in the analog format, and a third output signal that is the digital television (DTV) low-IF signals for television signals transmitted in the digital format.

The dual-format television receiver of the present invention provides many advantages not realized by conventional television receivers. First, by processing all signals in the digital domain, the TV receiver of the present invention eliminates the need for analog components, such as SAW filters. Thus, the TV receiver of the present invention can be readily integrated in one integrated circuit to reduce the size and the manufacturing cost of the receiver. In one embodiment, the dual-format TV receiver is formed as a monolithic integrated circuit. As such, the receiver integrates a large part of the components for a television receiver system into a single integrated circuit. A television receiver system incorporating the dual-format television receiver of the present invention can thus be built with minimal components, reducing the size and the overall manufacturing cost of the television receiver system. Another advantage of the dual-format TV receiver of the present invention is that the digital signal processor circuit of the receiver uses a single signal processing path to process television signals in either the analog format or the digital format. Thus, the need to duplicate components is entirely obviated. Finally, the digital signal processor circuit can be readily reconfigured to support multi-standard reception, thereby enabling the television receiver of the present invention to be used in any geographical area of interest.

Figure 1:
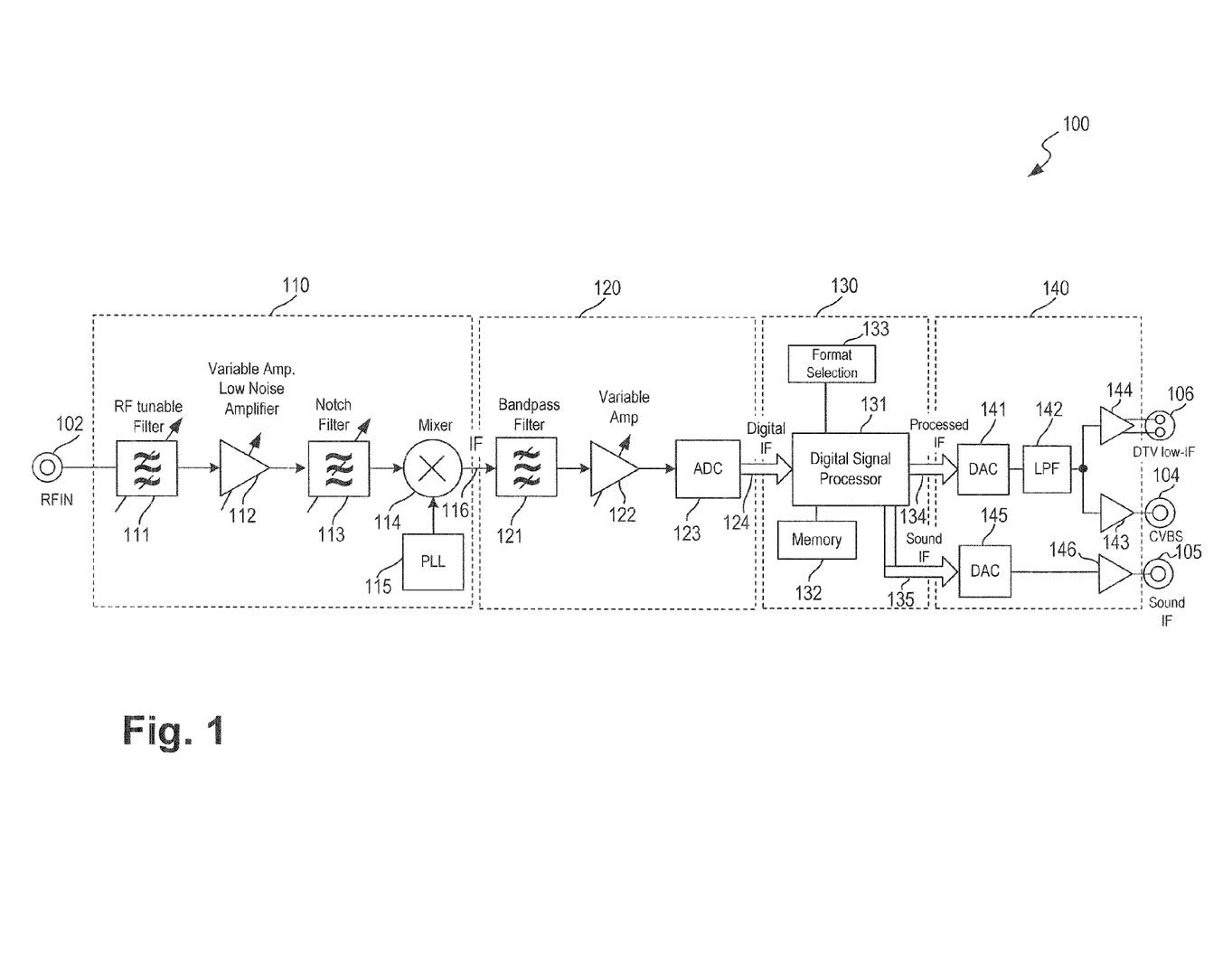
FIG. 1 is a schematic diagram of a dual-format television receiver according to one embodiment of the present invention.

FIG. 1 is a schematic diagram of a dual-format television receiver according to one embodiment of the present invention. Referring to FIG. 1, a dual-format television receiver 100 includes a signal input terminal 102 for receiving incoming RF signal, a first output terminal 104 for providing a first output signal for television signals transmitted in the analog format, a second output terminal 105 for providing a second output signal for television signals transmitted in the analog format, and a third output terminal 106 for providing a third output signal for television signals transmitted in the digital format. The signal input terminal and output terminals of receiver 100 can be configured as single-ended or differential terminals, depending on the applications.

In the present embodiment, signal input terminal 102 is a single-ended input terminal. In an alternate embodiment, a differential input terminal can also be used. When signal input terminal 102 is a differential input terminal, receiver 100 further includes a balun transformer to convert the differential input signals into a single-ended signal, as is well understood by one of ordinary skill in the art.

Furthermore, in the present embodiment, first and second output terminals 104, 105 are single-ended output terminals while third output terminal 106 is a differential output terminal. Third output terminal 106 therefore includes two signal ports providing differential signals. In the present description, a differential output terminal is sometimes referred to as an "output terminal" but it is understood that the differential output terminal actually includes two signal ports. As will be described in more detail below, each of the output terminals of receiver 100 can be configured as either a differential output terminal or a single-ended output terminal or two single-ended output terminals can be used to provide differential output signals. Moreover, receiver 100 can provide output signals in either analog or digital format on one or more output terminals. Thus, the output signals corresponding to the video and audio signals for analog television signals can be provided in either analog or digital format and using single-ended or differential output terminals. Similarly, the output signals corresponding to the video and audio signals for digital television signals can be provided in either analog or digital format and using single-ended or differential output terminals.

Dual-format TV receiver 100 processes the incoming RF signal and provides output signals depending on the television format of the incoming RF signal. When the incoming RF signal is in the analog television format, receiver 100 provides first and second output signals which can be decoded to generate the video and audio signals for display. When the incoming RF signal is in the digital television format, receiver 100 provides the third output signal which can be demodulated and decoded to generate the video and audio signals for display. In one embodiment, the dual-format TV receiver 100 is formed as a monolithic integrated circuit. Thus, an integrated circuit implementing TV receiver 100 of the present invention can include as few as five pins in the present embodiment, apart from the power supply and ground pins. As will be discussed in more detail below, in other embodiments of the dual-format TV receiver of the present invention, an integrated circuit implementing TV receiver 100 of the present invention can include as few as three pins, apart from the power supply and ground pins.

Referring to FIG. 1, receiver 100 includes a frequency conversion circuit 110 (or tuner circuit 110), a digitizing IF circuit 120, a digital signal processor (DSP) circuit 130 and a signal output circuit 140. Frequency conversion circuit 110 receives input RF signals on signal input terminal 102. The input RF signals can be received from terrestrial broadcast or cable transmissions. Frequency conversion circuit 110 operates to convert the input RF signal to an intermediate frequency (IF) signal using one or more frequency conversions. In the present illustration shown in FIG. 1, the input RF signal is first coupled to a RF tunable filter 111 which is a bandpass filter. Then, the filtered signal is coupled to a variable gain low noise amplifier 112. The output signal of amplifier 112 is coupled to a bandstop filter 113 which is also known as a "notch filter." The output signal of bandstop filter 113 is then coupled to a mixer 114, controlled by a phase-locked loop 115. Mixer 114 operates to tune the filtered input RF signal to the desired frequency range in one or more frequency conversions and generate the IF signal. Frequency conversion circuit 110 provides the IF signal on a terminal 116 have a preselected intermediate frequency.

In accordance with the present invention, frequency conversion circuit 110 can be designed to generate IF signals having an intermediate frequency of any values. The IF used by tuner 110 can be the same as or different than the IF specified by the worldwide standards. Furthermore, as receiver 100 uses a single digital signal processor for signal processing, tuner 110 can use the same IF for receiving analog or digital television signals in any standards. The value of the IF in an integrated tuner is a matter of design choice. In one embodiment, the IF is selected to be 20 MHz or higher.

The IF signal generated by frequency conversion circuit 110 having a preselected intermediate frequency is provided to digitizing IF circuit 120 of receiver 100. Digitizing IF circuit 120 includes a bandpass filter 121, a variable gain amplifier 122 and an analog-to-digital converter (ADC) 123. The IF signal is filtered by bandpass filter 121. Then, amplifier 122 operates on the filtered IF signal for the purpose of regulating the dynamic range of ADC 123. ADC 123 operates to digitize the analog IF signal and provide a digital IF signal on a terminal 124. Receiver 100 thereby performs subsequent processing in the digital domain entirely. By applying the appropriate sampling frequency at ADC 123 and the appropriate signal processing functions at DSP circuit 130, receiver 100 can handle television signals in any format (analog or digital) and in any standard (e.g.: NTSC, PAL, SECAM, DVB or ATSC).

In the present embodiment, ADC 123 is a 10-bit converter and has a sampling rate of up to 40 megasamples per second. In other embodiments, ADC 123 can have other resolution and in most applications, a resolution of greater than 9 bits will suffice. The sampling frequency of ADC 123 is selected based on the intermediate frequency of the IF signal and should be at least larger than twice the bandwidth of the intermediate frequency signal. The sampling frequency of ADC 123 can be adjusted by using a voltage controlled oscillator and a phase locked loop (not shown in FIG. 1). In an alternate embodiment, a tuning control circuit (not shown) can be included for adjusting the sampling frequency of ADC 123. The tuning control circuit can receive a control signal external to receiver 100, such as a manual control signal from a user. The tuning control circuit can also perform auto-detection of the intermediate frequency of the IF signals and adjust the operating frequencies of the ADC accordingly.

After the IF signal is filtered and digitized, the digital representation of the signal is processed by a digital signal processor (DSP) 131 in DSP circuit 130. DSP 131 processes the digital IF signal according to the television format and standard to which the input RF signal is encoded. In the present illustration, DSP circuit 130 includes a format/standard selection circuit 133 for selecting between the several analog television standards and the several digital television standards. DSP 131 applies the appropriate filter function, such as an impulse response, to the digital IF signals received on terminal 124 depending on the state of format/standard selection circuit 133. In one embodiment, the coefficients of the filter functions are stored in a look-up table in a memory 132 in DSP circuit 130. DSP 131 retrieves the coefficients from memory 132 to be applied to the incoming digital signals.

DSP 131 is a programmable and reconfigurable processor. In the present embodiment, DSP 131 implements a finite impulse response (FIR) filter which is reconfigured based on the TV standard selected. Furthermore, in the present embodiment, DSP 131 includes two computing units to speed up the computation time. Specifically, the filtering operations of the real and imaginary parts in the frequency domain are carried out in parallel. In other embodiments, DSP 131 may include only one computing unit.

Format/standard selection circuit 133 can be implemented in one of many ways. The selection of the correct format and television standard can be made manually by the user of the television system, such as by activating a switch, or the selection can be made automatically by providing an auto-detection capability in receiver 100. In the present embodiment, auto-detection is implemented by detecting in the first and second output signals the presence or absence of carrier signals which uniquely identify the television formats and standards. For example, analog television signals can be identified by the analog visual carrier signal while digital television signals can be identified by the pilot carrier. A detection circuit can be included in receiver 100 for generating a signal which is fed back to format/standard selection circuit 133 indicating which television format and standard the input signal is encoded. In other embodiments, other means for selecting between the different formats and standards can be used.

When the input RF signal is an analog television signal, DSP 131 applies a video filter function and a sound filter function to the digitized signals to separate the video signals from the audio signals. The video and sound filters can be implemented as FIR filters. DSP 131 can also implement other filter functions such as ghost cancellation for reducing the interference of the input signal. The filter response is then derived from the measured channel response. In the present embodiments, DSP 131 generates a processed IF signal on terminal 134 as the video baseband signal and a processed IF signal on terminal 135 as the audio baseband (or sound IF) signal.

When the input RF signal is a digital television signal, DSP 131 applies a filter function to the digitized signals. The filter function can be implemented as a FIR filter. An example is the ATSC-VSB standard where the filter response is specified as raised root cosine with 0.1152 roll-off (refer to the ATSC A-53 specification). Furthermore, additional filter functions, such as an equalizer for echo cancellation (multipath), can also be implemented in DSP 131. The filter response is then derived from the measured channel response. In the present embodiment, DSP 131 also performs a down-conversion function for converting the IF signal into a low IF signal.

The processed IF signals on terminals 134 and 135 are coupled to signal output circuit 140 to be converted into the desired output signals. In accordance with the present invention, signal output circuit 140 can assume various configurations to provide output signals in different formats. A configuration for signal output circuit 140 can be selected based on factors such as the desired pin count for receiver 100 and the desired format for the output signals. One useful feature of signal output circuit 140 is that the signal output circuit can be configured to provide output signals for analog TV format and digital TV format simultaneously. That is, a first set of output signals can be provided for the television signals received in the analog television format and a second set of output signals can be provided for the television signals received in the digital television format so that television signals for both analog and digital formats can be displayed at the same time. Simultaneous display of analog and digital television signals is not possible in the conventional television receivers as the conventional television receivers carry out input or output switching operation to select only one of the two television signals to be processed.

Figure 2:
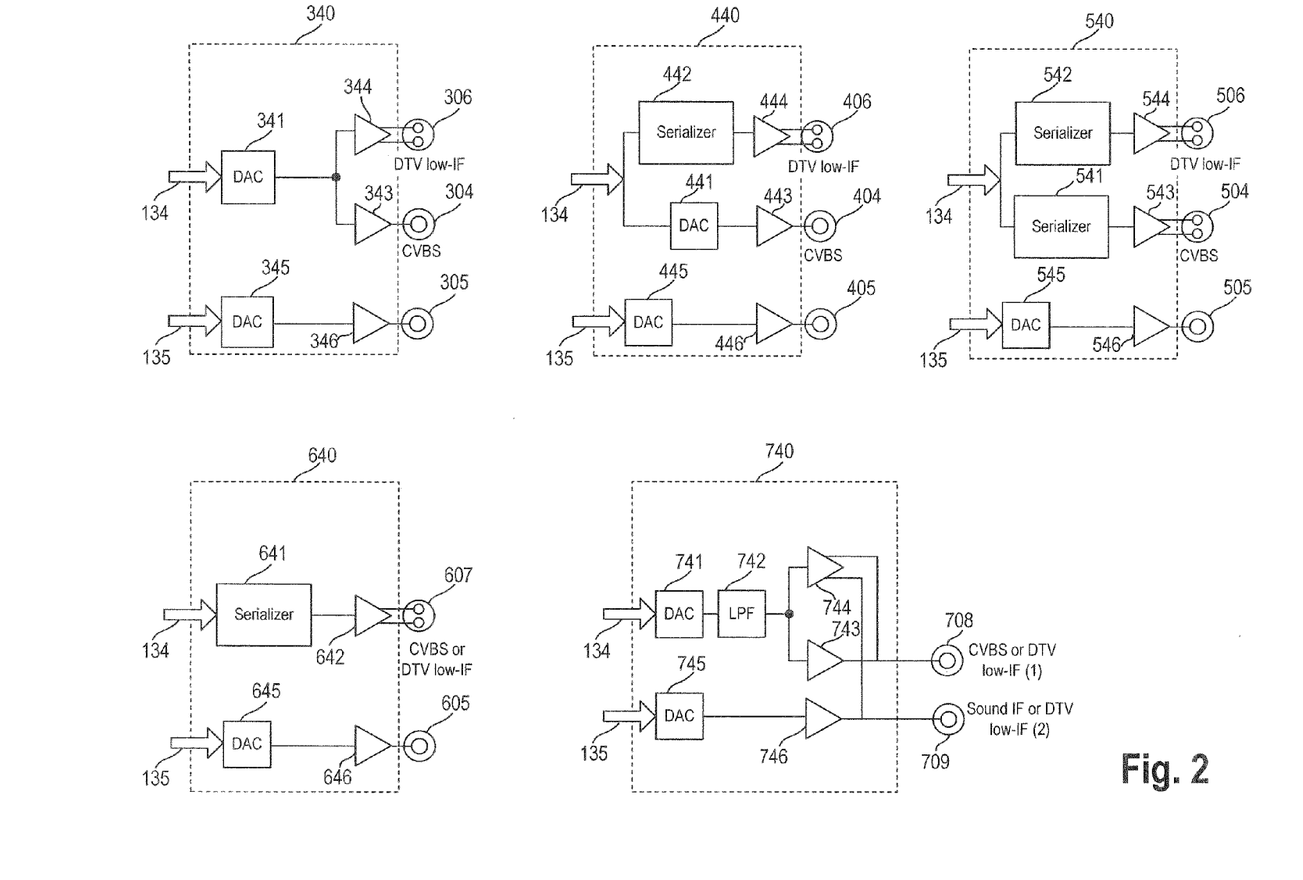
FIG. 2 is a block diagram illustrating alternate embodiments of the signal output circuit which can be incorporated in the dual-format television receiver of FIG. 1.

FIG. 1 illustrates one embodiment of a signal output circuit which can be incorporated in receiver 100 of the present invention. Other embodiments of the signal output circuit are shown in FIG. 2. Referring first to FIG. 1, signal output circuit 140 includes a digital-to-analog converter (DAC) 141 coupled to a low pass filter 142. The processed digital signals provided by DSP 131 on terminal 134 is coupled to DAC 141 to be converted back to analog format. The analog signal is filtered by low pass filter 142 to smooth out the signal. The filtered analog signal is coupled to a first driver 143 to provide a first output signal for analog television format on output terminal 104 and also to a second driver 144 to provide a third output signal for digital television format on output terminal 106. Meanwhile, DSP 131 also provides the processed digital sound signal on terminal 135 to a DAC 145. The output signal from DAC 145 is coupled to a third driver 146 to provide a second output signal on output terminal 105 for the analog television format. In the present embodiment, driver 143 and driver 146 are single-ended drivers while driver 144 is a differential output driver. In one embodiment, driver 144 is a low voltage differential signaling driver.

As thus configured, signal output circuit 140 provides analog television signals on output terminals 104 and 105 and digital television signals on output terminal 106 which is a differential output terminals (2 signal ports). In the present embodiment, the first output signal is a Composite Video Baseband Signal (CVBS) for analog television signals and the second output signal is the audio baseband signal for analog television signals. The third output signal is a DTV low-IF signal for digital television signals.

Turning now to FIG. 2 where alternate embodiments of the signal output circuit are shown. Referring to FIG. 2, in a first alternate embodiment, a signal output circuit 340 includes a digital-to-analog converter (DAC) 341 receiving the processed digital IF signal. The output terminal of DAC 341 is coupled directly to a first driver 343 providing a first output signal being the video baseband signal (CVBS) for analog television and a second driver 344 providing the DTV low-IF signal for digital television. Signal output circuit 340 eliminates the low pass filter that is used in signal output circuit 140 of FIG. 1. By providing DAC 341 with increased sample frequency, the low pass filter can be eliminated and signal output circuit 340 can be simplified as compared to signal output circuit 140. In signal output circuit 340, a DAC 345 coupled to a third driver 346 provides the audio baseband signal for analog television. Drivers 343 and 346 are single-ended drivers while driver 344 is a differential output driver.

In a second alternate embodiment, a signal output circuit 440 includes a digital-to-analog converter (DAC) 441 receiving the processed digital IF signal. The output terminal of DAC 441 is coupled directly to a first driver 443. DAC 441 and first driver 443 form the output signal path for the video baseband signals (CVBS) for analog television. A DAC 445 and a driver 446 form the output signal path for the audio baseband signals for analog television. For the digital television signals, signal output circuit 440 includes a serializer 442 for converting the processed digital IF signal from the DSP circuit into a serial digital data stream. In this manner, the digital signals for digital television can be provided to a digital demodulator through a serial digital interface. In signal output circuit 440, the serial digital data stream is coupled to a second driver 444 which is a differential output driver. In one embodiment, driver 444 is a low voltage differential signaling (LVDS) driver providing the DTV low-IF signal as low voltage differential signals.

In a third alternate embodiment, a signal output circuit 540 includes a first serializer 541 and a second serializer 542 so that the video signals from the signal output circuit are provided as serial digital interfaces. In this embodiment, first serializer 541 receives the processed digital IF signal and provides a serial digital data stream to a first driver 543. Driver 543 is a differential output driver and drives the serial digital data stream onto an output terminal 504. Serializer 542 and driver 544 form a parallel data path providing a serial digital data stream on an output terminal 506. The serial digital data on output terminal 504 can be coupled to a decoder circuit for decoding into video signals for analog television. An analog-to-digital converter may be included in the decoder circuit to convert the serial digital data into an analog format. The serial digital data on output terminal 506 can be coupled to a digital demodulator and a decoder for demodulating and decoding the digital television signals. A DAC 545 and a driver 546 form the output signal path for the audio baseband signals for analog television.

In the signal output circuits described above, the signal output circuits are configured to provide separate output signals for the analog television signal and the digital television signal. In a fourth alternate embodiment, a signal output circuit 640 includes a single serializer 641 coupled to a driver 642 providing a serial digital data stream on a single output terminal 604. In the present embodiment, driver 642 is a differential output drive and output terminal 604 is a differential output terminal including two signal ports. A DAC 645 and a driver 646 form the output signal path for the audio baseband signals for analog television.

In signal output circuit 640, one output signal in differential format is provided on output terminal 607. The single serial digital data stream can be coupled through a serial digital interface to a demodulator circuit for demodulating the digital television signal or to a decoder circuit for decoding analog television signal. Alternately, the single serial digital data stream from signal output circuit 640 can be coupled to an integrated circuit incorporating both the digital demodulator circuit and the analog decoding circuit. In that case, the single output terminal 607 can be coupled to a single input terminal of the demodulator/decoder integrated circuit where the demodulator/decoder integrated circuit provides an output signal for analog television and an output signal for digital television.

In the embodiments described above with reference to FIG. 2, the serializer can implement any types of serial digital interface. For example, the serial digital interface can be an asynchronous interface or a synchronous interface. The serial digital interface can be a bit serial interface or can be implemented according to any known serial digital interface standards, including but not limited to ANSI/SMPTE 259M, ITU-R (CCIR) 601, 656, DVB-ASI (EN 50083-9).

Finally, in a fifth alternate embodiment, a signal output circuit 740 includes a DAC 741 receiving the processed digital IF signal. DAC 741 is coupled to a low-pass filter 742. The filtered analog output signal is provided to a first driver 743 and a second driver 744. Low-pass filter 742 is optional and is not needed when DAC 741 has a high sampling rate. A DAC 745 and a third driver 746 form the output signal path for the audio baseband signals for analog television. In the present configuration, the first, second and third drivers share a first output terminal 708 and a second output terminal 709. Because of the sharing of the output terminals, drivers 743, 744 and 746 are tristate drivers and can be selectively turned off so that only one driver drives the output terminal at a time. In this manner, the pin count for the dual-format television receiver is reduced while the receiver can still provide video/audio signals for either the analog or the digital television format. Specifically, first driver 743, being a single-ended driver, drives video baseband signals (CVBS) onto first output terminal 708. Third driver 746, being a single-ended driver, drives audio baseband signals for analog television onto second output terminal 709. When the analog video and audio television signals are to be displayed, driver 744 is turned off. Alternate, second driver 744, being a differential output driver, drives the differential DTV low-IF signal onto first and second output terminals 708 and 109. When the digital television signal is to be displayed, drivers 743 and 746 are turned off.

In the above embodiments, the signal output circuit generates the audio output signal for analog television using a DAC and a single-ended driver. This configuration is suitable when the sampling rate of the DAC is high enough so that no filtering of the converted analog signal is needed. In other embodiments, a low-pass filter can be added between the DAC and the single-ended driver. In that case, the sampling rate of the DAC can be reduced.

A salient feature of the dual-format television receiver of the present invention is the use of a single programmable digital signal processing path for processing the received television signal regardless of the television format and standard in which the television signal is transmitted. Furthermore, the receiver provides output signals for the analog or digital television signals simultaneously. The receiver of the present invention thus enables the construction of a dual-format TV receiver system for providing analog and digital television display signals. The receiver can be built as a monolithic integrated circuit providing a single chip solution to the tuner and signal processing function of an analog/digital TV receiver.

Figure 3A:
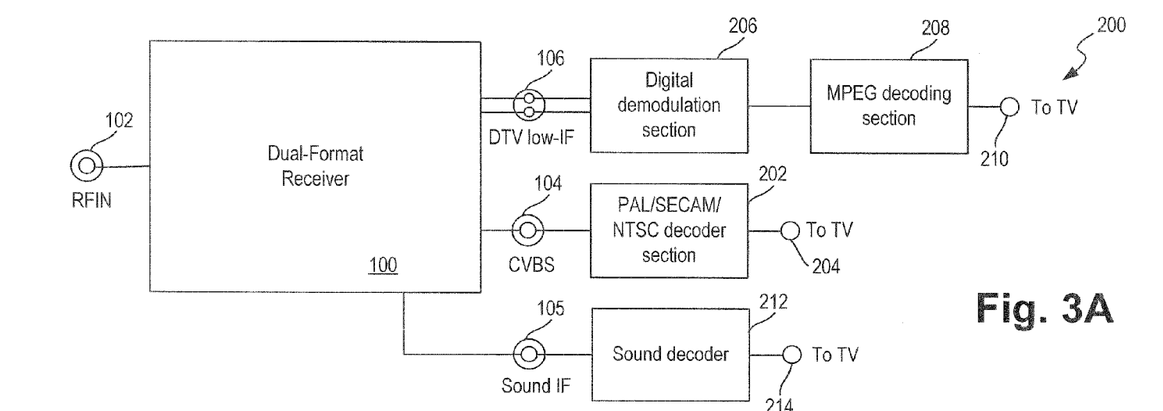
FIG. 3A is a block diagram of a dual-format television receiver system employing the television receiver of FIG. 1 according to one embodiment of the present invention.

FIG. 3A is a block diagram of a dual-format television receiver system employing dual-format television receiver 100 according to one embodiment of the present invention. Referring to FIG. 3A, dual-format television receiver system 200 incorporates dual-format television receiver 100 for receiving and processing the incoming RF signal. In the present illustration, receiver 100 incorporates signal output circuit 140 (FIG. 1), 340, 440 or 540 (FIG. 2). Thus, receiver 100 provides a video baseband signal (CVBS) for analog television, an audio baseband signal (sound IF), and a DTV low-IF signal for digital television. TV receiver system 200 includes the back-end circuits for generating the display signals and the audio playback signals for the television display.

In the present embodiment, the video baseband signal (CVBS) from receiver 100 is coupled to a decoder circuit 202. Decoder circuit 202 can be implemented as a PAL/SECAM/NTSC decoder circuit. Decoder circuit 202 provides video output signals on an output terminal 204 which can be coupled to a television for display. The sound IF signal from receiver 100 is coupled to a sound decoder circuit 212 to provide the audio output signals on a terminal 214 which can be coupled to a television for playback. Finally, the DTV low-IF signal is coupled to a demodulator circuit 206 for digital demodulation. Typically, digital television signals are modulated in a VSB, QAM or COFDM scheme. Demodulator circuit 206 operates to demodulate the DTV low-IF signal and generates an MPEG data stream as an output signal. The MPEG data stream generated by demodulator circuit 206 is coupled to a MPEG decoder circuit 208 to be decoded into the video and audio signals on an output terminal 210. The video and audio signals can then be provided to a television for display and playback.

Figure 3B:
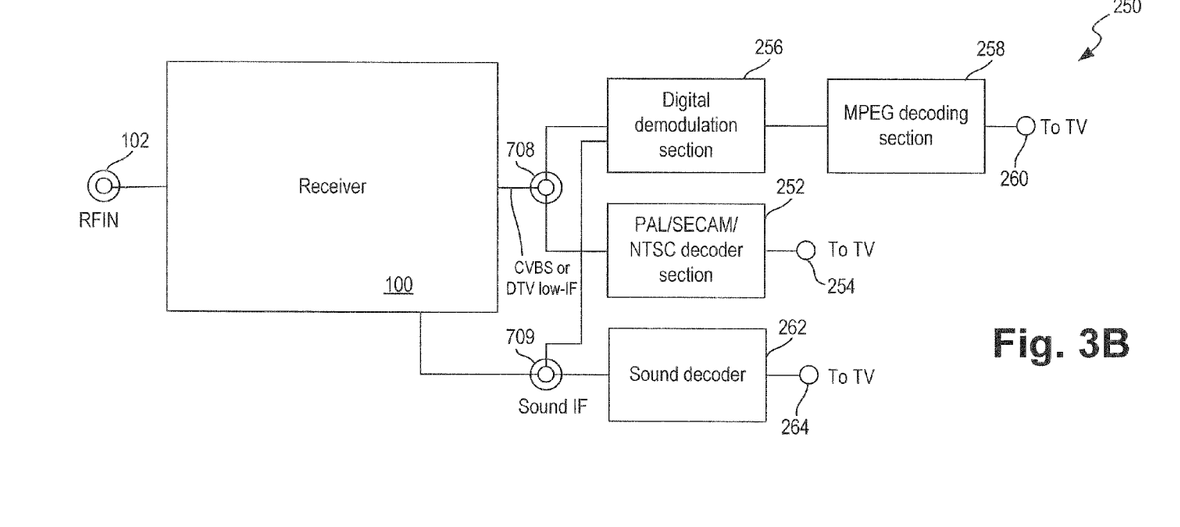
FIG. 3B is a block diagram of a dual-format television receiver system employing the television receiver of FIG. 1 according to an alternate embodiment of the present invention.

FIG. 3A illustrates one embodiment of a dual-format TV receiver system which can incorporate the dual-format television receiver of the present invention. Other embodiments of the TV receiver system are possible. In particular, the configuration of TV receiver system will depend on the configuration of the signal output circuit used by television receiver 100. FIG. 3B is a block diagram of a dual-format television receiver system employing television receiver 100 according to an alternate embodiment of the present invention.

Referring to FIG. 3B, TV receiver system 250 includes receiver 100 which incorporates signal output circuit 740 (FIG. 2). Thus, receiver 100 includes only two output terminals: a first output terminal 708 and a second output terminal 709. The two output terminals selectively provide the video baseband signals and audio baseband signals for analog television or the differential DTV low-IF signals. First output terminal 708 is coupled to a decoder circuit 252 for decoding analog television signals and to a demodulator circuit 256 for demodulating digital television signals. Demodulator circuit 256 is further coupled to a MPEG decoder circuit 258 to decode the MPEG data stream generated by the demodulator. Second output terminal 709 is coupled to a sound decoder circuit 262 for decoding sound IF signals for analog television. The second output terminal 709 is also coupled to demodulator circuit 256. When digital television signals are being processed by receiver 100, first and second output terminals 708, 709 functions as the differential output terminals providing the differential output signals indicative of the DTV low-IF signal. TV receiver system 250 can be operated to provide either analog television signal display or digital analog television signal display.

The above detailed descriptions are provided to illustrate specific embodiments of the present invention and are not intended to be limiting. Numerous modifications and variations within the scope of the present invention are possible. For instance, FIG. 2 illustrates various embodiments of the signal output circuit of the dual-format television (TV) receiver of the present invention. However, other embodiments of the signal output circuit are possible and FIG. 2 is not intended to limit the configuration of the signal output circuit to those illustrated. As described above, the signal output circuit can provide output signals in either analog or digital format and the output terminals of the signal output circuit can be single-ended or differential output terminals. The present invention is defined by the appended claims.

We claim:

1. A television receiver comprising:
    a frequency conversion circuit for receiving an input RF signal and for converting the input RF signal to an intermediate frequency signal having an intermediate frequency (IF), the input RF signal encoding information in one of a plurality of television signal formats;
    an analog-to-digital converter for sampling the intermediate frequency signal and generating a digital representation thereof;
    a signal processor for processing the digital representation of the intermediate frequency signal in accordance with the television signal format of the input RF signal, the signal processor generating digital output signals indicative of information encoded in the input RF signal, wherein the signal processor applies one of a plurality of finite impulse response filters to the digital representation of the intermediate frequency signal, each of the plurality of finite impulse response corresponding to a format of the input RF signal; and
a signal output circuit for receiving the digital output signals from the signal processor and for providing one or more output signals corresponding to the digital output signals.

2. The television receiver of claim 1, wherein the plurality of television signal formats comprises an analog television format and a digital television format.

3. The television receiver of claim 1, wherein the television receiver is formed as a monolithic integrated circuit.

4. The television receiver of claim 1, wherein the signal output circuit provides a first output signal being a video baseband signal corresponding to an analog television format and a second output signal being an audio baseband signal corresponding to the analog television format.

5. The television receiver of claim 4, further comprising:
a first decoder circuit coupled to decode the video baseband signal for providing video display signals corresponding to the analog television format; and
a second decoder circuit coupled to decode the audio baseband signal for providing audio signals corresponding to the analog television format.

6. The television receiver of claim 5, wherein the first decoder circuit comprises a PAL/SECAM/NTSC decoder circuit.

7. The television receiver of claim 1, wherein the signal output circuit provides a first output signal and a second output signal corresponding to the digital output signals, the first output signal and the second output signal being differential output signals corresponding to a digital television format.

8. The television receiver of claim 7, further comprising:
a demodulator circuit for demodulating the first output signal and the second output signal according to the television signal format of the input RF signal, the demodulator circuit generating video and audio baseband signals corresponding to the format of the input RF signal; and
a decoder circuit coupled to decode the video and audio baseband signals for providing video and audio display signals corresponding to the digital television format.

9. The television receiver of claim 8, wherein the video and audio baseband signals comprise a MPEG data stream and the decoder circuit comprises a MPEG decoder circuit.

10. The television receiver of claim 1, further comprising:
a bandpass filter coupled to receive the intermediate frequency signal from the frequency conversion circuit and generate a filtered intermediate frequency signal; and
a variable gain amplifier coupled to receive the filtered intermediate frequency signal and provide the amplified, filtered intermediate frequency signal to the analog-to-digital converter.

11. The television receiver of claim 1, wherein the signal output circuit provides output signals in an analog or a digital signal format.

12. The television receiver of claim 1, wherein the signal output circuit comprises one or more output terminals, each of the one or more output terminals of the signal output circuit comprises a single-ended output terminal or a differential output terminal.

13. The television receiver of claim 1, wherein the signal output circuit comprises:
a first digital-to-analog converter coupled to receive digital output signals from the signal processor and convert the digital output signals to analog output signals;
a first driver circuit for driving the analog output signals from the first digital-to-analog converter onto a first output terminal;
a second driver circuit for driving the analog output signals from the first digital-to-analog converter onto a second output terminal;
a second digital-to-analog converter coupled to receive digital output signals from the signal processor encoding audio information and convert the digital output signals to analog output signals; and
a third driver circuit for driving the analog output signals from the second digital-to-analog converter onto a third output terminal,
wherein the first and second output terminals provide signals indicative of video and audio information encoded in the input RF signal and the third output terminal provides signals indicative of audio information encoded in the input RF signal.

14. The television receiver of claim 13, wherein the first driver circuit comprises a single-ended driver circuit for driving analog output signals corresponding to an analog television format, the analog output signals being video baseband signals; and the third driver circuit comprises a single-ended driver circuit for driving analog output signals corresponding to the analog television format, the analog output signals being audio baseband signals.

15. The television receiver of claim 13, wherein the second driver circuit comprises a differential output driver circuit for driving analog output signals corresponding to a digital television format, the analog output signals being DTV low-IF signals, and wherein the second output terminal comprises a first differential output terminal and a second differential output terminal.

16. The television receiver of claim 13, wherein the signal output circuit further comprises:
a low pass filter coupled between the first digital-to-analog converter and the first and second driver circuits, the low pass filter providing low pass filtering function.

17. The television receiver of claim 13, wherein the signal output circuit further comprises:
a low pass filter coupled between the second digital-to-analog converter and the third driver circuit, the low pass filter providing low pass filtering function.

18. The television receiver of claim 1, wherein the signal output circuit comprises:
a first digital-to-analog converter coupled to receive digital output signals from the signal processor and convert the digital output signals to analog output signals;
a first driver circuit for driving the analog output signals from the first digital-to-analog converter onto a first output terminal;
a second driver circuit for driving the analog output signals from the first digital-to-analog converter, the second driver circuit comprising a differential output driver circuit having a first differential output terminal and a second differential output terminal, the first differential output terminal being coupled to the first output terminal and the second differential output terminal being coupled to a second output terminal;
a second digital-to-analog converter coupled to receive digital output signals from the signal processor encoding audio information and convert the digital output signals to analog output signals; and
a third driver circuit for driving the analog output signals from the second digital-to-analog converter onto the second output terminal, wherein the first and second output terminals provide differential output signals indicative of video and audio information encoded in the input RF signal when the input RF signal has a digital television signal format; and the first output terminal provides video information encoded in the input RF signal and the second output terminal provides signals indicative of audio information encoded in the input RF signal when the input RF signal has an analog television signal format.

19. The television receiver of claim 18, wherein the signal output circuit further comprises:
a low pass filter coupled between the first digital-to-analog converter and the first and second driver circuits, the low pass filter providing low pass filtering function.

20. The television receiver of claim 1, wherein the signal output circuit comprises:
a first serializer circuit coupled to receive the digital output signals from the signal processor and convert the digital output signals to a serial digital data stream;
a first driver circuit comprising a differential output driver for driving the serial digital data stream from the first serializer onto a first output terminal and a second output terminal;
a first digital-to-analog converter coupled to receive digital output signals from the signal processor encoding audio information and convert the digital output signals to analog output signals; and
a second driver circuit for driving the analog output signals from the first digital-to-analog converter onto a third output terminal,
wherein the first and second output terminals provide differential output signals indicative of video and audio information encoded in the input RF signal when the input RF signal has a digital television signal format and provide differential output signal indicative of video information when the input RF signal has an analog television signal format; and the third output terminal provides signals indicative of audio information encoded in the input RF signal when the input RF signal has an analog television signal format.

21. The television receiver of claim 20, wherein the first, second and third output terminals of the signal output circuit are coupled to a demodulator-decoder circuit, the demodulator-decoder circuit demodulating the serial digital data stream when the data stream corresponds to a digital television format and the demodulator-decoder circuit decoding the serial digital data stream when the data stream corresponds to an analog television format.

22. The television receiver of claim 20, wherein the signal output circuit further comprises:
a second digital-to-analog converter coupled to receive the digital output signals from the signal processor and convert the digital output signals to analog output signal; and
a third driver circuit for driving the analog output signals from the second digital-to-analog converter onto a fourth output terminal,
wherein the fourth output terminal provides signals indicative of video information encoded in the input RF signal when the input RF signal has an analog television signal format.

23. The television receiver of claim 20, wherein the signal output circuit further comprises:
a second serializer circuit coupled to receive the digital output signals from the signal processor and convert the digital output signals to a serial digital data stream; and
a third driver circuit comprising a differential output driver for driving the serial digital data stream from the second serializer onto a fourth output terminal and a fifth output terminal,
wherein the first and second driver circuits drive the serial digital data stream corresponding to a digital television format and the fourth and fifth driver circuits drive the serial digital data stream corresponding to an analog television format.

24. The television receiver of claim 1, wherein the plurality of finite impulse response filters are stored in a memory, and the signal processor indexes the memory to retrieve one of the plurality of finite impulse response filters.

25. The television receiver of claim 1, wherein the signal processor comprises a first computing unit and a second computing unit, the first computing unit processing a real part of the finite impulse response filter operation while the second computing unit processing an imaginary part of the finite impulse response filter operation.

26. The television receiver of claim 1, further comprising a format/standard selection circuit coupled to the signal processor, the format/standard selection circuit generating a select signal indicative of a format of the input RF signal and the signal processor selecting a finite impulse response filter in response to the select signal.

27. The television receiver of claim 26, wherein the format/standard selection circuit generates the select signal in response to an input signal from a user.

28. The television receiver of claim 26, wherein the format/standard selection circuit generates the select signal by detecting carrier signals identifying one of the formats of the input RF signals.

29. The television receiver of claim 1, wherein the input RF signal comprises an RF signal received from terrestrial broadcast, an RF signal received from satellite broadcast, and an RF signal received from cable transmission.

* * * * *

UNITED STATES PATENT AND TRADEMARK OFFICE
CERTIFICATE OF CORRECTION

PATENT NO. : 7,265,792 B2  Page 1 of 1
APPLICATION NO. : 10/884347
DATED : September 4, 2007
INVENTOR(S) : Favrat et al.

It is certified that error appears in the above-identified patent and that said Letters Patent is hereby corrected as shown below:

In the Claims

Column 11, line 1 (claim 1 line 18), insert -- filters -- after "response."

Signed and Sealed this
Eleventh Day of March, 2014

Michelle K. Lee
*Deputy Director of the United States Patent and Trademark Office*

Disclaimer

7,265,792 B2 — Pierre Favrat, Milpitas, CA (US); Alain-Serge Porret, Sunnyvale, CA (US); Dominique Python, Sunnyvale, CA (US); Friederich Mombers, San Jose, CA (US); Richard P. Perring, San Jose, CA (US); Philippe Duc, Santa Clara, CA (US); Benito Carnero, Santa Clara, CA (US); and Didier Margairaz, San Jose, CA (US). TELEVISION RECEIVER FOR DIGITAL AND ANALOG TELEVISION SIGNALS. Patent dated September 4, 2007. Disclaimer filed October 1, 2014, by the assignee, Cresta Technology Corporation.

Hereby disclaims the term of this patent and shall not extend beyond the expiration date of patent no. 7,075,585.

*(Official Gazette, January 6, 2015)*